United States Patent
Ozaki et al.

(10) Patent No.: US 8,700,103 B2
(45) Date of Patent: Apr. 15, 2014

(54) VEHICLE TERMINAL APPARATUS AND PROGRAM PRODUCT FOR VEHICLE TERMINAL APPARATUS

(75) Inventors: Takahisa Ozaki, Gamagori (JP); Soichi Saito, Obu (JP); Suguru Matsushita, Obu (JP); Ryuuji Sakata, Kariya (JP); Kazushige Hayashi, Toyota (JP); Shinichi Yamamoto, Toyota (JP); Hirokazu Ishida, Nagoya (JP); Yosuke Nakanishi, Okazaki (JP); Masao Sasaki, Okazaki (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 322 days.

(21) Appl. No.: 13/202,675
(22) PCT Filed: Aug. 2, 2010
(86) PCT No.: PCT/JP2010/004867
§ 371 (c)(1), (2), (4) Date: Aug. 22, 2011
(87) PCT Pub. No.: WO2011/016218
PCT Pub. Date: Feb. 10, 2011

(65) Prior Publication Data
US 2011/0306338 A1 Dec. 15, 2011

(30) Foreign Application Priority Data

Aug. 6, 2009 (JP) ................. 2009-183709
Jul. 6, 2010 (JP) ................. 2010-154117

(51) Int. Cl.
*H04M 1/00* (2006.01)
(52) U.S. Cl.
USPC ............. 455/569.1; 455/569.2; 455/41.2; 455/423
(58) Field of Classification Search
USPC .......... 455/423–425, 569.1, 569.2, 41.1, 41.2
See application file for complete search history.

(56) References Cited

U.S. PATENT DOCUMENTS

2003/0045235 A1* 3/2003 Mooney et al. ............... 455/41
2004/0106378 A1 6/2004 Kim et al.
(Continued)

FOREIGN PATENT DOCUMENTS

JP 8-079390 3/1996
JP 2002-27558 1/2002
(Continued)

OTHER PUBLICATIONS

Examination Report dated Jul. 26, 2013 in corresponding CN Application No. 201080010639.8 (with English translation).
(Continued)

*Primary Examiner* — Ajit Patel
(74) *Attorney, Agent, or Firm* — Harness, Dickey & Pierce, PLC

(57) ABSTRACT

A vehicle terminal apparatus has a connection monitoring unit for monitoring a disconnection of a communication link between a wireless communication device and a portable terminal, considering an abnormal disconnection of the communication link as a link loss, considering a disconnection of the communication link by a disconnection process by the wireless communication device as a first disconnection, and considering a disconnection of the communication link by a disconnection process, by the portable terminal as a second disconnection; and a connection condition determination unit for determining a wireless connection condition of the wireless communication device based on a disconnection reason that accounts for a reason for disconnection and a pre-disconnection call condition that is a call condition of the portable terminal immediately before the disconnection when the disconnection of the communication link is detected by the connection monitoring unit. The vehicle terminal apparatus determines a recovery process of the communication link by appropriately considering the user convenience.

12 Claims, 4 Drawing Sheets

(56) References Cited

U.S. PATENT DOCUMENTS

| | | |
|---|---|---|
| 2004/0204161 A1* | 10/2004 | Yamato et al. ............ 455/569.1 |
| 2005/0070338 A1 | 3/2005 | Nagahama et al. |
| 2005/0208981 A1 | 9/2005 | Kawasaki |
| 2007/0105548 A1 | 5/2007 | Mohan et al. |
| 2008/0280655 A1 | 11/2008 | Ozaki |

FOREIGN PATENT DOCUMENTS

| | | |
|---|---|---|
| JP | 2004-180244 | 6/2004 |
| JP | 2005-110049 | 4/2005 |
| JP | 2005-268971 | 9/2005 |
| JP | 2005-277474 | 10/2005 |
| JP | 2007-104403 | 4/2007 |
| JP | 2008-278172 | 11/2008 |
| JP | 2008-312055 | 12/2008 |
| WO | WO97/13385 | 4/1997 |
| WO | 2005-057956 | 6/2005 |

OTHER PUBLICATIONS

International Search Report and Written Opinion of the ISA for PCT/JP2010/004867, ISA/JP, mailed Oct. 26, 2010.
Office Action dated Jan. 27, 2014 in the corresponding DE Application No. 112010003198.3 with English translation.

* cited by examiner

FIG. 1

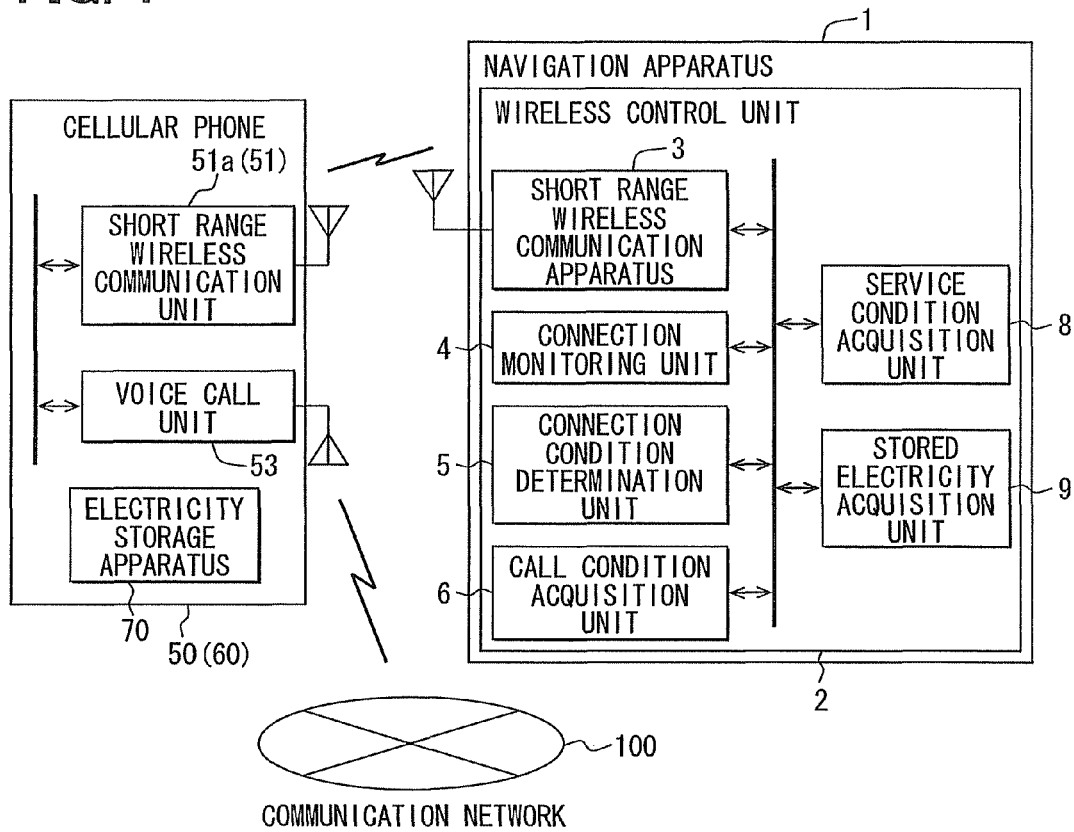

FIG. 2

| DISCONNECTION REASON | CALL CONDITION | SERVICE CONDITION | CONDITION |
|---|---|---|---|
| LINK LOSS | — | — | CONNECTION REQUEST CONDITION |
| FIRST DISCONNECTION | — | — | STANDBY CONDITION |
| SECOND DISCONNECTION | WAITING | — | STANDBY CONDITION |
| | RECEIVING | — | STANDBY CONDITION |
| | DIALING | IN-AREA | STANDBY CONDITION |
| | DIALING | OUT-OF-AREA | CONNECTION REQUEST CONDITION |
| | RINGING | — | STANDBY CONDITION |
| | CALLING | — | CONNECTION WAIT CONDITION |

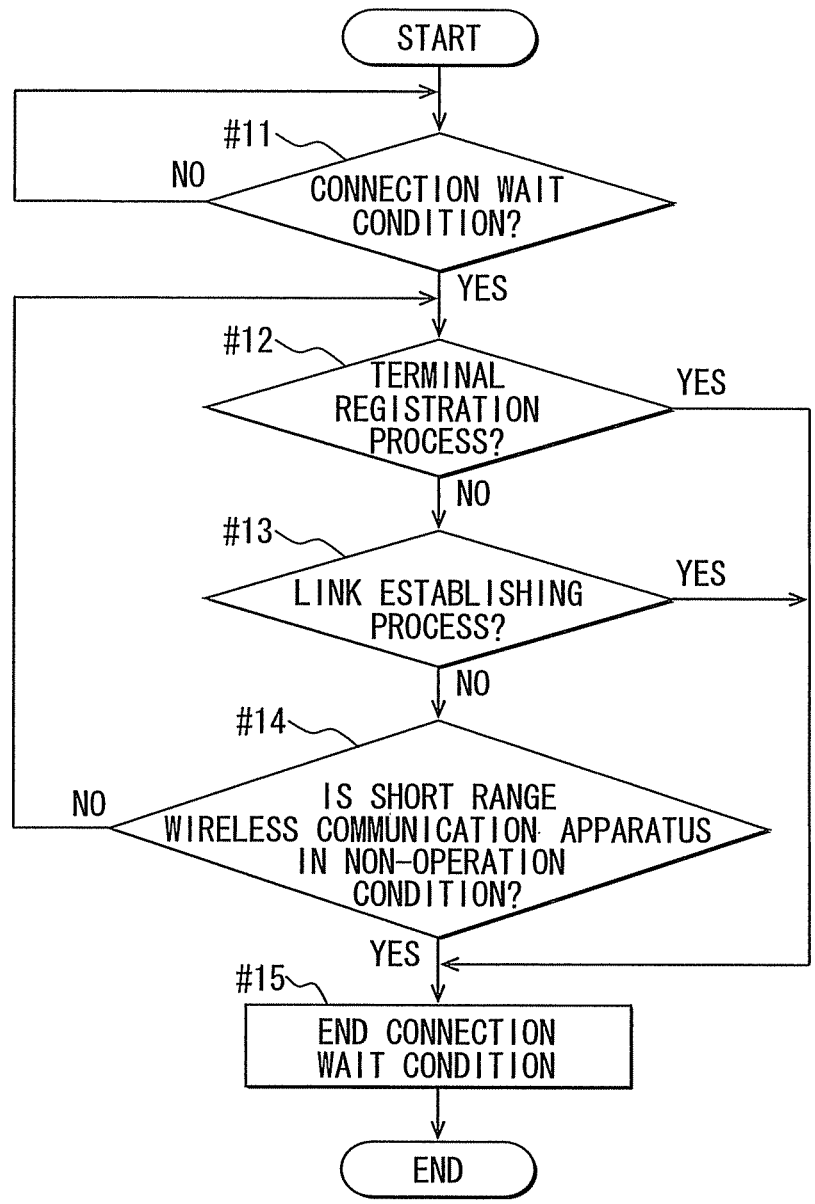

VEHICLE TERMINAL APPARATUS AND PROGRAM PRODUCT FOR VEHICLE TERMINAL APPARATUS

CROSS-REFERENCE TO RELATED APPLICATIONS

The present application is a 371 U.S. National Stage of International Application No. PCT/JP2010/004867, filed Aug. 2, 2010, which is based on a Japanese patent application No. 2009-183709, filed Aug. 6, 2009 and also on a Japanese patent application No. 2010-154117, filed Jul. 6, 2010. The disclosures of the above applications are incorporated herein with reference.

TECHNICAL FIELD

The present invention is regarding a vehicle terminal apparatus and a wireless connection program for the vehicle terminal apparatus, the vehicle terminal apparatus equipped with a wireless communication device that is capable of performing a short range wireless communication for wirelessly connecting to a portable terminal that is, by using the wireless communication device, capable of executing a voice call through communication network and the short range wireless communication.

BACKGROUND ART

Conventionally, a vehicle navigation apparatus having a handsfree call function is available, such as one disclosed in a patent document 1 described below. The navigation apparatus disclosed in the patent document 1 has a Bluetooth communication function, and is configured to perform a handsfree call with speakers and a microphone in the navigation apparatus through wireless connection to a cellular phone having a Bluetooth communication function.

In the above configuration, which utilizes a short range wireless communication such as a Bluetooth communication or the like, the vehicle navigation apparatus and the cellular phone suffer from a "link loss" due to a too-long distance between the navigation apparatus and the cellular phone or deterioration of communication environment, and a communication link between the two devices is disconnected. On the other hand, a user may operate the navigation apparatus or the cellular phone to disconnect the communication link, intentionally, to cause a disconnection of the communication link between the vehicle navigation apparatus and the cellular phone.

[Patent document] JP-A-2008-278172

As described above, in case that a communication link between a vehicle terminal apparatus (in the example of the patent document 1, the vehicle navigation apparatus) and a portable terminal (in the example of the patent document 1, the cellular phone) is disconnected, there is no disclosure about how to handle the disconnection of the communication link in the patent document 1. In such a case, the disconnection of the communication link may be, for example, uniformly recovered to re-establish the communication link, or may be uniformly left unattended without performing a recovery process of the communication link, in configuration. However, such uniformly configured handling of the disconnection of the communication link may lead to inconvenience of the user, with no user intention reflected to the recovery process.

In view of the above and other problems, a vehicle terminal apparatus that allows an appropriate determination of a recovery process of a communication link, appropriately considering the convenience and the benefit of the user of the apparatus, has long been desired, which is now provided as the present invention.

DISCLOSURE OF INVENTION

In an aspect of the present invention, a vehicle terminal apparatus includes, as characteristic configuration: a wireless communication device for performing a short range wireless communication, in which the vehicle terminal apparatus connects the wireless communication device to a portable terminal that enables a voice call and the short range wireless communication through a communication network; a connection monitoring unit for monitoring a disconnection of a communication link between the wireless communication device and the portable terminal, considering an abnormal disconnection of the communication link as a link loss, considering a disconnection of the communication link by a disconnection process by the wireless communication device as a first disconnection, and considering a disconnection of the communication link by a disconnection process by the portable terminal as a second disconnection; and a connection condition determination unit for determining a wireless connection condition of the wireless communication device based on a disconnection reason that accounts for a reason of disconnection and a pre-disconnection call condition that is a call condition of the portable terminal immediately before the disconnection when the disconnection of the communication link is detected by the connection monitoring unit.

In the present invention, the term "call condition" is used to indicate conditions regarding a voice call function. That is, for example, the call condition includes, a "waiting" condition, a "receiving" condition, a "dialing" condition, a "ringing" condition, a "calling" condition, and the like.

The above configuration of the vehicle terminal apparatus allows the user to determine the recovery process of the communication link appropriately in consideration for user convenience and benefits, because a wireless connection condition of the wireless communication device is determined based on both of the disconnection reason and the pre-disconnection call condition.

In other words, a condition of the portable terminal, classifiable based on the call condition regarding the voice call performed by the portable terminal through the communication network, allows the determination of the condition of the portable terminal at each and every timing, including a timing of disconnection of the communication link. Further, by considering the disconnection reason of the communication link and the pre-disconnection call condition, a user-desired recovery process from the disconnection of the communication link, at respectively different after-disconnection wireless connection conditions, can be appropriately determined and provided from the vehicle terminal apparatus.

The present invention is devised in view of the above characteristics specific to the portable terminal that is capable of performing the voice call, thereby allowing the user to appropriately recover from the disconnection of the communication link, based on the configuration that determines the wireless connection condition of the wireless communication device in consideration of both of the disconnection reason and the pre-disconnection call condition. In other words, the wireless connection condition of the wireless communication device is determined from a point of view whether or not the short range wireless communication is going to be used after the disconnection of the communication link. For example, the vehicle terminal apparatus is configured to put the wireless communication device in a condition for recovery of the communication link if it is determined that the short range wireless communication is going to be used, and, if it is not determined that the short range wireless communication is going to be used, the wireless communication device is not put in a condition for recovery of the communication link, thereby allowing and assisting the user to determine the recovery process, appropriately in consideration for the convenience and benefit of the user of the apparatus.

The operation of the connection condition determination unit is preferably configured to select and determine, as a wireless connection condition of the wireless communication device, one of a connection request condition for transmitting a connection request to the portable terminal, a connection wait condition for waiting for reception of a connection request transmitted from the portable terminal, or a standby condition for performing none of transmission of the connection request to the portable terminal and the waiting for reception of the connection request from the portable terminal.

In the above configuration, when a communication link recovery process is performed, according to the wireless connection condition of the portable terminal after disconnection of the communication link, an appropriate condition is selected from among the connection request condition and the connection wait condition. In this manner, a quick recovery of the communication link is enabled when a recovery of the communication link is determined to be required. On the other hand, when a recovery of the communication link is not determined to be required, the standby condition is selected as the wireless connection condition of the portable terminal. Therefore, the portable terminal is prepared for the next process.

Further, in the above-described configuration of the connection condition determination unit that selects and determines, as a wireless connection condition of the wireless communication device, one of a connection request condition, a connection wait condition, and a standby condition, the connection condition determination unit is preferably configured to select and determine the connection wait condition when the disconnection reason is the second disconnection and the pre-disconnection call condition is a calling condition.

In the above configuration, when the portable terminal is configured to transmit the connection request to the vehicle terminal apparatus if the disconnection reason is the second disconnection and the pre-disconnection call condition is the calling condition, a quick recovery of the communication link is enabled.

Further, as described above, in case that the connection condition determination unit is configured to select and determined the connection wait condition when the disconnection reason is the second disconnection and the pre-disconnection call condition is a calling condition, the connection condition determination unit is preferably configured to end the connection wait condition when a connection identification process for preparation of wireless connection or for changing the wireless connection condition to the communication terminal that is capable of performing the short range wireless communication is performed, or when the wireless communication device is put in a communication failure condition that is incapable of establishing the communication link by the short range wireless communication.

In the above configuration, an end condition for ending the connection wait condition is appropriately set when the wireless connection condition of the wireless communication device is determined as the connection wait condition. Therefore, keeping the connection wait condition for an unnecessarily long time is prevented, thereby preventing an unnecessary increase of the process load of the processor in the vehicle terminal apparatus.

Further, in case that the connection condition determination unit is configured to end the connection wait condition when a connection identification process for preparation of wireless connection or for changing a wireless connection condition to the communication terminal that is capable of performing the short range wireless communication is performed, or when the wireless communication device is put in the communication failure condition that is incapable of establishing the communication link by the short range wireless communication, the connection identification process preferably includes a terminal registration process for registering the communication terminal as an object terminal of wireless connection and a link establishing process for establishing the communication link by the short range wireless communication to the communication terminal, and the communication failure condition includes a non-operation condition in which the wireless communication device is not in operation.

In the above configuration, the end condition of the connection wait condition is more appropriately set when the wireless connection condition of the wireless communication device is determined as the connection wait condition.

Further, as described above, in case that the connection condition determination unit is configured to select and determine the connection wait condition when the disconnection reason is the second disconnection and the pre-disconnection call condition is the calling condition, the connection wait condition preferably accepts the connection request only from the portable terminal that has performed the second disconnection.

In the above configuration, the communication link to the portable terminal that has performed the second disconnection is more securely recovered. Further, in the above configuration, an unintentional establishment of the communication link to a communication terminal that is different from the communication terminal that has performed the second disconnection without regard to the user intention and an establishment of the communication link by a non-standard procedure are prevented.

Further, as described above, in case that the connection condition determination unit is configured to select and determine one of the connection request condition, the connection wait condition and the standby condition as the wireless connection condition of the wireless communication device, the connection condition determination unit preferably selects and determines the connection request condition if the disconnection reason is the link loss, and the connection condition determination unit preferably selects and determines the connection wait condition if the disconnection reason is the first disconnection or if the disconnection reason is the second disconnection with the pre-disconnection call condition being none of the dialing condition and the calling condition.

In the above configuration, when the disconnection reason is the link loss, the recovery of the communication link is quickly tried. On the other hand, when the disconnection reason is the second disconnection and the pre-disconnection call condition is none of the dialing condition or the calling condition, the recovery process of the communication link is not performed, thereby enabling a preparation for the next process.

Further, when the communication link to the portable terminal is further evaluated by a pre-disconnection service condition which is determined as one of an in-area condition that the portable terminal is in a voice call serviceable area and an out-of-area condition that the portable terminal is out of the voice call serviceable area, the connection condition determination unit is preferably configured to determine a wireless connection condition of the wireless communication device based further on the pre-disconnection service condition.

In the above configuration, the recovery process of the communication link is determined appropriately for the user convenience by further considering the service condition that is specific to a portable terminal that is capable of performing the voice call.

Further, as described above, in case that the connection condition determination unit is configured to determine the wireless connection condition of the wireless communication device based further on the pre-disconnection service condition, the connection condition determination unit is preferably configured to select and determine the standby condition that performs none of transmission of the connection request to the portable terminal and the waiting for reception of the connection request from the portable terminal when the disconnection reason is the second disconnection and the pre-disconnection call condition of the second disconnection is the dialing condition and the pre-disconnection service condition is the in-area condition. Furthermore, in the same above case, the connection condition determination unit is preferably configured to select and determine the connection request condition for transmitting the connection request to the portable terminal when the disconnection reason is the second disconnection and the pre-disconnection call condition of the second disconnection is the call sending condition and the pre-disconnection service condition is the out-of-area condition.

In the above configuration, when the disconnection reason is the second disconnection and the pre-disconnection call condition is the dialing condition and the pre-disconnection service condition is the in-area condition, the recovery of the communication link is quickly tried. On the other hand, when the disconnection reason is the second disconnection and the pre-disconnection call condition is the dialing condition and the pre-disconnection service condition is the in-area condition, by not performing the recovery, process of the communication link, a preparation for the next process is enabled.

Further, when the portable terminal has an electricity storage unit for operating the portable terminal, and the connection condition determination unit is preferably configured to determine a wireless connection condition of the wireless communication device based further on a pre-disconnection electricity amount that indicates an amount of the electricity stored in the electricity storage unit immediately before the disconnection of the communication link.

In the above configuration, the recovery process of the communication link is determined more appropriately for the user convenience by recognizing the electricity amount that is specific characteristic of the portable terminal.

Further, as described above, in case that the connection condition determination unit is configured to determine a wireless connection condition of the wireless communication device based further on the pre-disconnection electricity amount, the connection condition determination unit is preferably configured to select and determine the standby condition that performs none of transmission of the connection request to the portable terminal and the waiting for reception of the connection request from the portable terminal when the pre-disconnection electricity amount is equal to or smaller than a threshold. In this case, the threshold may preferably be determined according to a purpose of the wireless connection by the short range wireless communication. For example, if the purpose of the wireless connection by the short range wireless communication is a handsfree call, the threshold may be a value of the stored electricity amount that defines each of "continuously-callable" times, such as one minute, five minutes, or the like. Further, the threshold may be determined based, not on the purpose of the wireless connection by the short range wireless communication, but on the stored electricity amount at a time of full charge of the electricity storage unit. For example, the threshold may preferably be a value of 5%, or 10% of the stored electricity amount at the time of full charge.

When the stored electricity amount of the portable terminal is decreased to a level that does not allow the portable terminal to provide an acceptable service to the vehicle terminal apparatus through the short range wireless communication, it is not preferable to connect the vehicle terminal apparatus to the portable terminal. The above configuration does not perform the recovery process of the communication link in such a case.

The technical features of the vehicle terminal apparatus having each of the above configurations in the present invention are applicable to a wireless connection method of the vehicle terminal apparatus and a wireless connection program of the vehicle terminal apparatus. Therefore, the present invention can include such method and program as an object of claim.

In such case, the characteristic configuration of a program product for performing wireless connection by controlling a computer to serve as a vehicle terminal apparatus are: having a wireless communication device for performing a short range wireless communication by, which the wireless communication device is connected to a portable terminal that enables a voice call and the short range wireless communication through a communication network; providing a connection monitoring unit for monitoring a disconnection of a communication link between the wireless communication device and the portable terminal, in which the connection monitoring unit considers an abnormal disconnection of the communication link as a link loss, considers a disconnection of the communication link by a disconnection process by the wireless communication device as a first disconnection, and considers a disconnection of the communication link by a disconnection process by the portable terminal as a second disconnection; and providing a connection condition determination unit for determining a wireless connection condition of the wireless communication device based on a disconnection reason that accounts for a reason for disconnection and a pre-disconnection call condition that is a call condition of the portable terminal immediately before the disconnection when the disconnection of the communication link is detected by the connection monitoring unit.

Naturally, the wireless connection program for the above-described vehicle terminal apparatus can exert above-described advantageous effects through functioning, and can have additional technical features described above as preferable configurations.

BRIEF DESCRIPTION OF DRAWINGS

FIG. 1 is a block diagram of a handsfree system in a first embodiment of the present invention.

FIG. 2 is a diagram of determination rules for determining an after-disconnection condition of a short range wireless communication apparatus in the first embodiment of the present invention.

FIG. 5 is a flowchart of a process performed by a connection condition determination unit in the second embodiment of the present invention.

PREFERRED EMBODIMENT

1. First Embodiment

Figure 3:
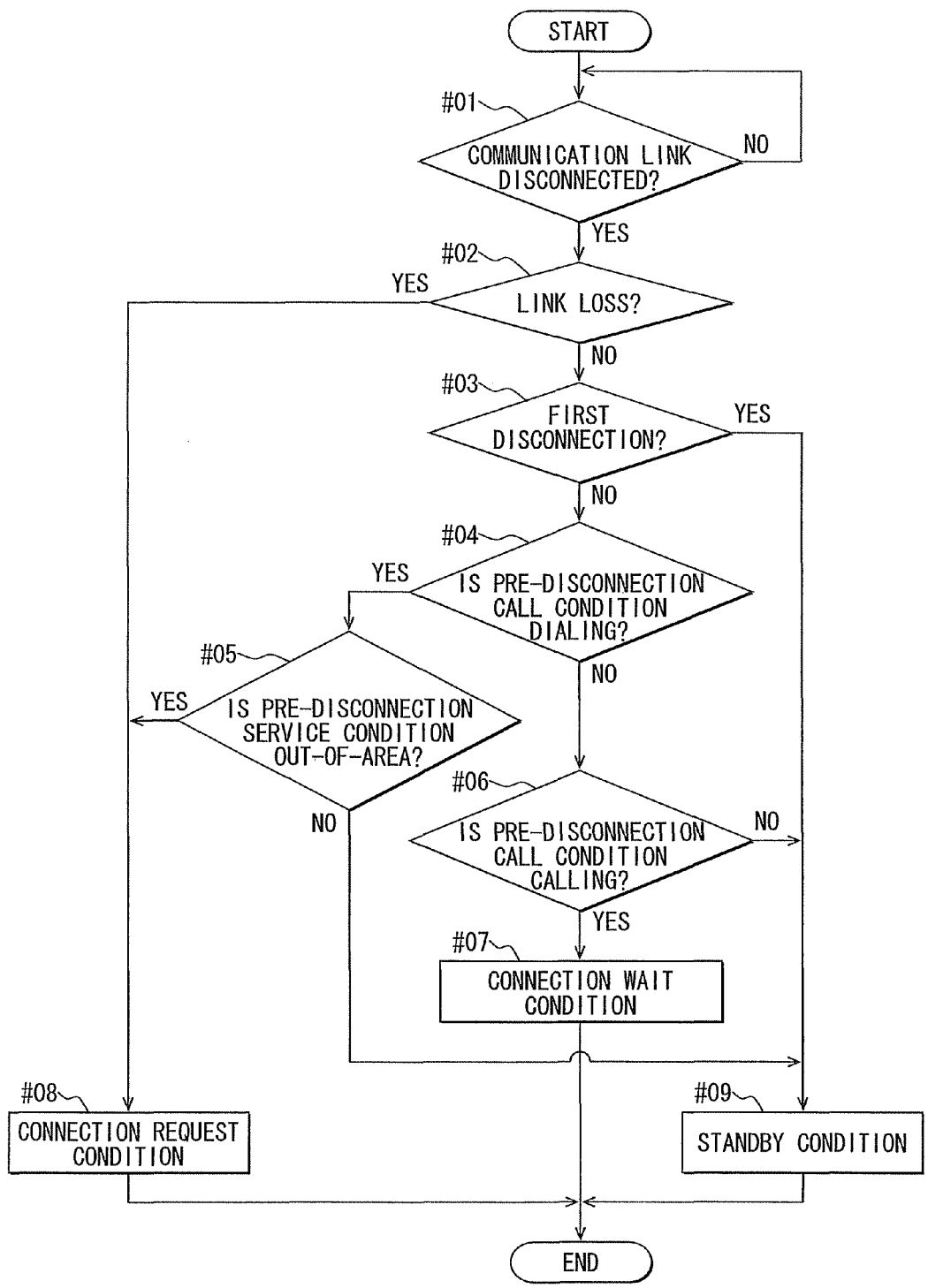
FIG. 3 is a flowchart of a wireless connection process in the first embodiment of the present invention.

The first embodiment of the present invention is explained with reference to the drawings. As shown in FIG. 1, a navigation apparatus 1 and a cellular phone 50 are used to form a handsfree system, as an example. The navigation apparatus 1 is equipped with a short range wireless communication apparatus 3, and is configured to be wirelessly connected to the cellular phone 50 through the short range wireless communication apparatus 3. Further, the navigation apparatus 1 is equipped with a connection, condition determination unit 5 that determines a wireless connection condition of the short range wireless communication apparatus 3 at a time when a communication link once established between the short range wireless communication apparatus 3 and the cellular phone 50 is disconnected. The navigation apparatus 1 in the present embodiment is characterized by this connection condition determination unit 5, which determines the wireless connection condition of the short range wireless communication apparatus 3 after the disconnection of the communication link based on a disconnection reason of the communication link, a call condition of the cellular phone 50 immediately before the disconnection (i.e., a pre-disconnection call condition), and a service condition of the cellular phone 50 immediately before the disconnection (i.e., a pre-disconnection service condition). In the following, the configuration of the handsfree system of the present embodiment is explained in detail with a focus on the configuration of the navigation apparatus 1. The navigation apparatus 1, the cellular phone 50, and the short range wireless communication apparatus 3 in the present embodiment respectively correspond to "a vehicle terminal apparatus," "a portable terminal," and "a wireless communication apparatus" in claim language of the present invention.

1-1. Entire Configuration of the Handsfree System

As shown in FIG. 1, the handsfree system of the present embodiment includes the navigation apparatus 1 and the cellular phone 50. Both of the navigation apparatus 1 and the cellular phone 50 are capable of executing the short range wireless communication of the same standard, and are wirelessly connected with each other through the short range wireless communication. In this manner, a user can perform a voice call (i.e., a handsfree call) via the cellular phone 50 only by operating the navigation apparatus 1 without directly operating the cellular phone 50. In other words, the user performing the handsfree call can conduct the voice call without actually holding the cellular phone 50 in his/her hand. In this case, Bluetooth communication and an infra-red communication are known as examples of the short range wireless communication. Naturally, the standard of the short range wireless communication is not necessarily limited to the above-described ones, but also include other standards to be used in the present embodiment.

The navigation apparatus 1 is an apparatus installed in a vehicle, and is configured to have a central processing unit for performing various navigation functions such as an own vehicle position display, a route calculation from a start point to a destination, a route guidance toward the destination, a destination search and the like. These navigation functions are performed in a well-known configuration, thereby not being explained in detail. Further, FIG. 1 shows only invention relevant portions of the navigation apparatus 1 from among many configuration elements.

The navigation apparatus 1 has, as shown in FIG. 1, the short range wireless communication apparatus 3. More practically, a wireless control unit 2 in the navigation apparatus 1 has the short range wireless communication apparatus 3. The configuration of the wireless control unit 2 is described later in detail.

The navigation apparatus 1 is configured to wirelessly connect to the cellular phone 50 through the wireless control unit 2, that is, through, the short range wireless communication apparatus 3.

The navigation apparatus 1 is configured to automatically connect wirelessly to the cellular phone 50 at a power-on timing of a main power source, if the cellular phone 50 preregistered to the navigation apparatus 1 exists within a reach of the short range wireless communication and the cellular phone 50 is in a wirelessly-connectable condition of the short range wireless communication. Further, even in case that the navigation apparatus 1 is not automatically connected to the cellular phone 50, the communication link between the navigation apparatus 1 and the cellular phone 50 can be established by the operation of the user on a display-input apparatus (not illustrated) of the navigation apparatus 1. The display-input apparatus may be equipped with, for example, a combination of a display unit and an input unit such as a touch panel or the like, together with other operation switches.

The cellular phone 50 is configured to be capable of performing a voice call through a communication network 100 and a short range wireless communication. In other words, the cellular phone 50 is a kind of a communication terminal 60 that is capable of performing the short range wireless communication, and is capable of performing the voice call through the communication network 100 in addition to the short range wireless communication. In this example, the communication network 100 is a cellular phone network. Such a configuration of the cellular phone 50 is publicly known, and thus is not explained in detail in the following. Further, in FIG. 1, the configuration of the cellular phone 50 shows only invention relevant portions in the illustration. Further, the communication network 100 is not limited to the cellular phone network, but is changeable to include compatible networks that accommodate the communication standard of the cellular phone 50. For example, if the cellular phone 50 is capable of performing a voice call through the Internet, the communication network 100 may be the Internet communication network such as a wireless local area network (LAN) or the like publicly known in the art.

The cellular phone 50 is equipped with, as shown in FIG. 1, a short range wireless communication unit 51a, a voice call unit 53, and an electricity storage apparatus 70. The short range wireless communication unit 51a is a function unit that performs the same standard of the short range wireless communication as the navigation apparatus 1. The voice call unit 53 acquires a voice of the call destination through the communication network 100 as voice signals, and transmits the voice signals to the call destination through the communication network 100. The electricity storage apparatus 70 drives the cellular phone 50, and is configured as a secondary battery such as a Lithium Ion secondary battery or the like.

The user uses a voice input apparatus (not illustrated) and a voice output apparatus (not illustrated) in the navigation apparatus 1 or in the vehicle having the navigation apparatus 1 for performing the handsfree call. The voice input apparatus may be, for example, a microphone, and the voice output apparatus may be, for example, a speaker, an earphone, a headphone or the like. The voice of the user is input to the navigation apparatus 1 as the voice signals through the above-described voice input apparatus, and the inputted voice signals are transmitted to the cellular phone 50 through the short range wireless communication. The cellular phone 50 then transmits the voice signals received from the navigation apparatus 1 to the call destination through the communication network 100. On the other hand, the voice of the call destination is transmitted as the voice signals to the cellular phone 50 through the communication network 100. The cellular phone 50 which has received the voice signals from the communication network 100 transmits the voice signals to the navigation apparatus 1 through the short range wireless communication, and the voice of the call destination is output from the above-described voice output apparatus. In other words, the "handsfree call" which is performed by a handsfree function is a call that is performed with transmission of the voice signals between the vehicle terminal apparatus (i.e., the navigation, apparatus 1 in this example) and the portable terminal (i.e., the cellular phone 50 in this example). The "handsfree call" may be configured to be performed with (a) only one of the voice input of the user's voice and the voice output of the call destination performed by using the voice input apparatus or the voice output apparatus installed in the navigation apparatus 1 or installed in the vehicle having the navigation apparatus 1 (none of them illustrated) and (b) the other of the voice input/output performed by using the voice input apparatus or the voice output apparatus in the cellular phone 50 (none of them illustrated).

1-2. Configuration of the Wireless Control Unit

The configuration of the wireless control unit 2 is explained in the following. The wireless control unit 2 has, as shown in FIG. 1, the short range wireless communication apparatus 3 and other function units. In the present embodiment, a connection monitoring unit 4, a connection condition determination unit 5, a call condition acquisition unit 6, a service condition acquisition unit 8, and a stored electricity acquisition unit 9 are provided as the function units. These function units are respectively configured to be implemented as hardware or software (i.e., a program) or a combination of the hardware and the software, by using a central processing unit in separate packages or in one common package for processing inputted data. Further, these function units are configured to exchange information therebetween through communication lines such as a digital transmission bus or the like. In this case, the function units implemented as software (i.e., a program) is stored in a memory unit such as RAM, ROM or the like which can be referred to by the processing unit. In the following, the details of the wireless control unit 2 in the present embodiment are explained.

1-2-1. Short Range Wireless Communication Apparatus

The short range wireless communication apparatus 3 is equipped with a communication apparatus such as an antenna for data transmission and reception by the short range wireless communication with the cellular phone 50 and a control unit for setting and changing a wireless connection condition, together with other units. In the present embodiment, a current call condition of the cellular phone 50, a current service condition of the cellular phone 50, and a currently stored electricity amount of the electricity storage apparatus 70 are configured to be transmitted as information from the cellular phone 50 to the short range wireless communication apparatus 3. Further, when the handsfree call function is performed, the short range wireless communication apparatus 3 transmits and receives the voice signals to and from the cellular phone 50.

Further, when the disconnection of the communication link once established between the short range wireless communication apparatus 3 and the cellular phone 50 is detected, the connection condition determination unit 5 determines the wireless connection condition of the short range wireless communication apparatus 3, as described later in detail. Then, the condition determined by the connection condition determination unit 5 is input to the short range wireless communication apparatus 3 as information, and the short range wireless communication apparatus 3 performs a process based on the determination of the connection condition determination unit 5. In this manner, the short range wireless communication apparatus 3 is kept in a condition that is determined by the connection condition determination unit 5, for a predetermined period.

1-2-2. Call Condition Acquisition Unit

The call condition acquisition unit 6 serves as a call condition acquisition unit that acquires a current call condition of the cellular phone 50. In the present embodiment, at a regular interval, the current call condition of the cellular phone 50 is transmitted as information from the cellular phone 50 to the short range wireless communication apparatus 3 by the short range wireless communication, and the transmitted information is configured to be transmitted from the short range wireless communication apparatus 3 to the call condition acquisition unit 6. In this manner, the call condition acquisition unit 6 acquires the call condition of the cellular phone 50 at the regular interval. The call condition of the cellular phone 50 may also be preferably transmitted from the cellular phone 50 to the short range wireless communication apparatus 3, and to the call condition acquisition unit 6 when the call condition of the cellular phone 50 is changed, instead of transmitting the condition at the regular interval.

In the present embodiment, the call condition of the cellular phone 50 is classified as five conditions of "waiting," "receiving," "dialing," "ringing," and "calling." In this case, "waiting" is a condition that has no operation being performed regarding the voice call function, and the "waiting" is a condition that is different from four other conditions, of "receiving," "dialing," "ringing," and "calling." The condition "receiving" is a condition in which the call destination is calling the subject cellular phone. The condition "dialing" is a condition in which the subject cellular phone is dialing to the call destination. The condition "ringing" is a condition in which the telephone of call destination is ringing. The condition "calling" is a condition in which the voice call is being performed with the call destination.

The call condition acquisition unit 6 is configured to store the current call condition of the cellular phone 50 after acquiring the condition, at least until the subsequent acquisition of the current call condition of the cellular phone 50. In this manner, the connection condition determination unit 5 described later can acquire, from the call condition acquisition unit 6, a pre-disconnection call condition of the cellular phone 50, which is a call condition immediately before the disconnection of the communication link, when the link once established between the short range wireless communication apparatus 3 and the cellular phone 50 is disconnected.

1-2-3. Service Condition Acquisition Unit

The service condition acquisition unit 8 serves as a service condition acquisition unit that acquires the current service condition of the cellular phone 50. In the present embodiment, at a regular interval, the current service condition of the cellular phone 50 is transmitted as information from the cellular phone 50 to the short range wireless communication apparatus 3 by the short range wireless communication, and the transmitted information is configured to be transmitted from the short range wireless communication apparatus 3 to the service condition acquisition unit 8. In this manner, the service condition acquisition unit 8 acquires the service condition of the cellular phone 50 at the regular interval. The service condition of the cellular phone 50 may also be preferably transmitted from the cellular phone 50 to the short range wireless communication apparatus 3, and to the service condition acquisition unit 8 when the service condition of the cellular phone 50 is changed, instead of transmitting the condition at the regular interval.

In the present embodiment, the service condition of the cellular phone 50 is classified as two conditions of "in-area," and "out-of-area." In this case, the condition "in-area" is a condition in which the cellular phone 50 is in a service area of performing the voice call, and the condition "out-of-area" is a condition in which the cellular phone 50 is outside of the service area. Further, the current service condition of the cellular phone 50 acquired by the service condition acquisition unit 8 is configured to be displayed as information on the display unit of the navigation apparatus 1 (not illustrated).

The service condition acquisition unit 8 is configured to store the current service condition of the cellular phone 50 after acquiring the condition, at least until the subsequent acquisition of the current service condition of the cellular phone 50. In this manner, the connection condition determination unit 5 described later can acquire, from the service condition acquisition unit 8, a pre-disconnection service condition of the cellular phone 50, which is a service condition immediately before disconnection of the communication link, when the link once established between the short range wireless communication apparatus 3 and the cellular phone 50 is disconnected.

1-2-4. Stored Electricity Acquisition Unit

The stored electricity acquisition unit 9 has a function for acquiring a current electricity storage amount (i.e., stored electricity) of the electricity storage apparatus 70 in the cellular phone 50. In the present embodiment, at the regular interval, the amount of the stored electricity is transmitted as information from the cellular phone 50 to the short range wireless communication apparatus 3 by the short range wireless communication, and the transmitted information is configured to be transmitted from the short range wireless communication apparatus 3 to the stored electricity acquisition unit 9. In this manner, the stored electricity acquisition unit 9 can acquire the current electricity storage amount of the electricity storage apparatus 70 at the regular interval. Further, the current electricity storage amount acquired by the stored electricity acquisition unit 9 is configured to be displayed as information on the display unit of the navigation apparatus 1 (not illustrated). The stored electricity acquisition unit 9 is configured to store the current electricity storage amount of the electricity storage apparatus 70 after acquiring the amount, at least until the subsequent acquisition of the current electricity storage amount of the electricity storage apparatus 70.

1-2-5. Connection Monitoring Unit

The connection monitoring unit 4 serves as a connection monitoring unit that monitors the disconnection of the communication link by the short range wireless communication once established between the short range wireless communication apparatus 3 and the cellular, phone 50. In the present embodiment, the disconnection of the communication link monitored by the connection monitoring unit 4 has three disconnection types of "link loss," "first disconnection," and "second disconnection." The connection monitoring unit 4 is configured to transmit the disconnection reason as information to the connection condition determination unit 5 to be described later when the disconnection of the communication link is detected.

The "link loss" is an abnormal disconnection of the communication link due to, for example, a too-long distance between the navigation apparatus 1 and the cellular phone 50 or deterioration of communication environment caused by another short range wireless communication apparatus such as a portable audio or the like, operating nearby. The link loss may also be observed when the navigation apparatus 1 or the cellular phone 50 is broken, or the cellular phone 50 is suddenly turned off due to the shortage of the stored electricity amount in the electricity storage apparatus 70, besides other reasons.

The "first disconnection" is the disconnection of the communication link by a disconnection process of the short range wireless communication apparatus 3 (i.e., the navigation apparatus 1). In other words, the "first disconnection" is a disconnection of the communication link according to a normal procedure of the disconnection process of the short range wireless communication apparatus 3. The "first disconnection" includes, for example, the disconnection of the communication link according to a user operation for disconnecting the communication link on an input apparatus in the navigation apparatus 1 (not illustrated).

The "second disconnection" is the disconnection of the communication link by a disconnection process of the cellular phone 50. In other words, the "second disconnection" is a disconnection of the communication link according to a normal procedure of the disconnection process of the cellular phone 50. The "second disconnection" includes, for example, the disconnection of the communication link according to a user operation for disconnecting the communication link on the cellular phone 50. In this case, the "user operation for disconnecting the communication link" includes not only a direct user operation on the cellular phone 50 regarding the disconnection of the communication link but also, for example, a voice transfer operation performed by the user for the "calling" condition of the handsfree call by using the cellular phone 50, in which an operation with an intention to output the voice of the call destination from the voice output apparatus (e.g., a speaker) of the cellular phone 50 is performed by the user, resulting to be considered as the disconnection of the communication link by the user operation. In this case, the voice transfer (also known as "call transfer") is performed by the user operation (i.e., including manual operations, operations through voice recognition and the like) on the display-input apparatus of the navigation apparatus 1 (not illustrated). Further, the voice transfer may be performed by the user operation on the cellular phone 50. That is, the voice transfer operation includes the user operation on the navigation apparatus 1 and the user operation on the cellular phone 50. Furthermore, the "second, disconnection" includes a disconnection of the communication link by a disconnection process by the cellular phone 50 at a certain timing, regardless of the user operation. In the present embodiment, the cellular phone 50 is configured to perform the disconnection process regardless of the user operation, when the current service condition changes from the "in-area" condition to the "out-of-area" condition (a) at a moment of the dialing to the call destination from the cellular phone 50 or (b) during a period between the start of dialing and the start of ringing at the call destination.

1-2-6. Connection Condition Determination Unit

The connection condition determination unit 5 serves as a connection condition determination unit for determining the wireless connection condition of the short range wireless communication apparatus 3 when the disconnection of once-established communication link is detected by the connection monitoring unit 4. In the present embodiment, the connection condition determination unit 5 determines the wireless connection condition of the short range wireless communication apparatus 3 based on a disconnection reason of the communication link, the pre-disconnection call condition, and the pre-disconnection service condition. In this case, the information of the disconnection reason of the communication link is input from the connection monitoring unit 4 to the connection condition determination unit 5, and the information of the pre-disconnection call condition and the pre-disconnection service condition is respectively input from the call condition acquisition unit 6 and the service condition acquisition unit 8 to the connection condition determination unit 5.

The connection condition determination unit 5 selects and determines, as the wireless connection condition of the short range wireless communication apparatus 3, one of three conditions, a "connection request condition" for transmitting a connection request to the cellular phone 50, a "connection wait condition" for waiting a reception of the connection request from the cellular phone 50, and a "standby condition" for performing none of the transmission of the connection request to the cellular phone 50 and waiting of reception of the connection request from the cellular phone 50.

Further, as described above, the short range wireless communication apparatus 3 is kept in the condition that is determined by the connection condition determination unit 5 for the predetermined period. In the present embodiment, the "predetermined period" at a time of selection of the "connection request condition" or the "connection wait condition" by the connection condition determination unit 5 is a period until a recovery of the communication link to the cellular phone 50. That is, the "connection request condition" or the "connection wait condition" is kept until the communication link to the cellular phone 50 is recovered. In other words, the "connection request condition" or the "connection wait condition" ends on a condition that the communication link to the cellular phone 50, is recovered, which serves as an end condition. Then, after the end of the "connection request condition" or the "connection wait condition," the short range wireless communication apparatus 3 is put in the "standby" condition.

In the present embodiment, the wireless connection condition of the short range wireless communication apparatus 3 after the disconnection of the once-established communication link is determined according to the rules shown in FIG. 2. The disconnection reason in FIG. 2 is a disconnection reason of the once-established communication link, and the "call condition" is the pre-disconnection call condition of the cellular phone 50, and the "service condition" is the pre-disconnection service condition of the cellular phone 50, and the "condition" is the wireless connection condition of the short range wireless communication apparatus 3 after the disconnection of the once-established communication link. Further, the sign "-" in FIG. 2 indicates no distinction for all conditions.

When the disconnection reason is the "link loss," the user is generally assumed to be desiring the recovery of the communication link after the disconnection of the communication link, regardless of the pre-disconnection call condition or the pre-disconnection service condition. Therefore, as shown in FIG. 2, the connection condition determination unit 5 selects and determines the "connection request condition" when the disconnection reason is the "link loss," regardless of the pre-disconnection call condition or the pre-disconnection service condition. According to this configuration, the recovery of the communication link can be quickly tried when the disconnection reason is the link loss.

When the disconnection reason is the "first disconnection," the user is generally assumed not to desire the recovery of the communication link after the disconnection of the communication link, regardless of the pre-disconnection call condition or the pre-disconnection service condition. Therefore, as shown in FIG. 2, the connection condition determination unit 5 selects and determines the "standby condition" when the disconnection reason is the "first disconnection," regardless of the pre-disconnection call condition or the pre-disconnection service condition.

In the present embodiment, in case that the communication link is disconnected by the disconnection process of the cellular phone 50 as a result of the above-described voice transfer operation by the user during the "calling" condition of the handsfree call by using the cellular phone 50, it is assumed that the connection request is transmitted from the cellular phone 50 to the navigation apparatus 1 after the end of the call. In other words, it is assumed that the voice transfer operation by the user during the "calling" condition of the handsfree call by using the cellular phone 50 results in the disconnection of the communication link by the disconnection process of the cellular phone 50 after the transfer of the voice. Further, as described above, it is assumed that, when the current service condition changes from the "in-area" condition to the "out-of-area" condition (a) at a moment of the dialing to the call destination from the cellular phone 50 or (b) during a period between the start of dialing and the start of the ringing on the call destination, the disconnection process is performed from the cellular phone 50 side.

As described above, when the voice transfer operation is performed during the "calling" condition of the handsfree call by the cellular phone 50, the connection request is transmitted from the cellular phone 50 to the navigation apparatus 1 after the end of the call. In such a case, the navigation apparatus 1 is preferably put in a condition that can accept the connection request from the cellular phone 50 after such ending of the call. Therefore, the connection condition determination unit 5 selects and determines the "connection wait condition" when the disconnection reason is the "second disconnection" and the pre-disconnection call condition is the "calling" condition. In this case, the voice transfer is performed when the user performs the voice transfer operation on the navigation apparatus 1 or when the user performs the voice transfer operation on the cellular phone 50. The present embodiment does not distinguish the above two operations, thus, the voice transfer operation by the user uniformly puts the short range wireless communication apparatus 3 in the "connection wait condition" in configuration.

Further, as described above, when the current service condition changes from the "in-area" condition to the "out-of-area" condition (a) at a moment of the dialing to the call destination from the cellular phone 50 or (b) during a period between the start of dialing and the start of ringing at the call destination, the disconnection process is performed from the cellular phone 50 side, regardless of the user operation. In such a case, the user tends to perform the dialing of the handsfree call function again, indicating that the user generally desires to recover the communication link. Therefore, the connection condition determination unit 5 selects and determines the "connection request condition" when the disconnection reason is the "second disconnection," and the pre-disconnection call condition is the "dialing" condition, together with the pre-disconnection service condition being the "out-of-area" condition. According to this configuration, the recovery of the communication link is quickly tried.

On the other hand, when the communication link is disconnected by the user operation on the cellular phone 50 during the call condition other than the "dialing" or "calling" of the handsfree call, the user is not generally assumed to desire the recovery of the communication link after the disconnection of the communication link. Therefore, regardless of the pre-disconnection service condition, the connection condition determination unit 5 selects and determines the "standby condition" when the disconnection reason is the "second disconnection" and the pre-disconnection call condition is not the "dialing" condition or the "calling" condition. Further, in the present embodiment, the disconnection process from the cellular phone 50 side is not performed except for the user operation when the call condition of the cellular phone 50 is the "dialing" condition of the handsfree call and the service condition of the cellular phone 50 is the "in-area" condition. Therefore, in case that the disconnection process is performed from the cellular phone 50 side when the call condition of the cellular phone 50 is the "dialing" condition of the handsfree call and the service condition of the cellular phone 50 is the "in-area" condition, the user is not generally assumed to desire the recovery of the communication link. Thus, the connection condition determination unit 5 selects and determines the "standby condition" when the disconnection reason is the "second disconnection," and the pre-disconnection call condition is the "dialing" condition, together with the pre-disconnection service condition being the "in-area" condition.

As described above, because the wireless connection condition of the short range wireless communication apparatus 3 is determined based on the disconnection reason of the communication link, the pre-disconnection call condition and the pre-disconnection service condition, the recovery process of the communication link is determined based on an appropriate consideration of the user convenience and benefits. In other words, the wireless connection condition of the short range wireless communication apparatus 3 is determined from a view point whether or not the short range wireless communication is used after the disconnection of the communication link.

1-3. Procedure of Connection Process

Procedure of the wireless connection process (i.e., a wireless connection method) performed by the navigation apparatus 1 in the present embodiment is explained with reference to FIG. 3 in the following. The procedure of the wireless connection process is performed by hardware or software (i.e., a program) of each of the function units in the above-described navigation apparatus 1. When each of the function units is implemented as a program, the processing unit in the navigation apparatus 1 serves as a computer that performs the program for implementing the function of each of the function units.

When the disconnection of the once-established communication link between the navigation apparatus 1 (i.e., the short range wireless communication apparatus 3) and the cellular phone 50 is detected by the connection monitoring unit 4 (step #01:Yes), the information of the disconnection reason of the connection link is transmitted from the connection monitoring unit 4 to the connection condition determination unit 5. Further, the information of the pre-disconnection call condition and the pre-disconnection service condition is transmitted respectively from the call condition acquisition unit 6 and from the service condition acquisition unit 8 to the connection condition determination unit 5. In this manner, the connection condition determination unit 5 acquires the disconnection reason, the pre-disconnection call condition, and the pre-disconnection service condition when the disconnection of the communication link is detected.

Then, the connection condition determination unit 5 determines whether or not the disconnection reason is the "link loss" (step #02). If the disconnection reason is the "link loss" (step #02:Yes), the connection condition determination unit 5 selects and determines the "connection request condition" as the wireless connection condition of the short range wireless communication apparatus 3 after the disconnection of the communication link (step #08). On the other hand, if the disconnection reason is not the "link loss" (step #02:No), the connection condition determination unit 5 determines whether or not the disconnection reason is the "first disconnection" (step #03). If the disconnection reason is the "first disconnection" (step #03:Yes), the connection condition determination unit 5 selects and determines the "standby condition" as the wireless connection condition of the short range wireless communication apparatus 3 after the disconnection of the communication link (step #09).

If the disconnection reason is not the "first disconnection" (step #03:No), that is, if the disconnection reason is the "second disconnection," the connection condition determination unit 5 determines whether or not the pre-disconnection call condition is the "dialing" condition (step #04). If the pre-disconnection call condition is the "dialing" condition (step #04:Yes), the connection condition determination unit 5 determines whether or not the pre-disconnection service condition is the "out-of-area" condition (step #05). If the pre-disconnection service condition is the "out-of-area" condition (step #05:Yes), the connection condition determination unit 5 selects and determines the "connection request condition" as the wireless connection condition of the short range wireless communication apparatus 3 after the disconnection of the communication link (step #08). On the other hands, if the pre-disconnection service condition is not the "out-of-area" condition (step #05:No), that is, if the pre-disconnection service condition is the "in-area" condition, the connection condition determination unit 5 selects and determines the "standby condition" as the wireless connection condition of the short range wireless communication apparatus 3 after the disconnection of the communication link (step #09).

If the pre-disconnection call condition is not the "dialing" condition (step #04:No), the connection condition determination unit 5 determines whether or not the pre-disconnection call condition is the "calling" condition (step #06). If the pre-disconnection call condition is the "calling" condition (step #06:Yes), the connection condition determination unit 5 selects and determines the "connection wait condition" as the wireless connection condition of the short range wireless communication apparatus 3 after the disconnection of the communication link (step #07). On the other hand, if the pre-disconnection call condition is not the "calling" condition (step #06:No), that is, the pre-disconnection call condition is not the "dialing" condition or the "calling" condition, the connection condition determination unit 5 selects and determines the "standby condition" as the wireless connection condition of the short range wireless communication apparatus 3 after the disconnection of the communication link (step #09).

2. Second Embodiment

The second embodiment of the present invention is explained in the following with reference to FIGS. 4 and 5. The navigation apparatus 1 in the present embodiment is basically the same as the first embodiment. However, the end condition of the "connection wait condition" when the connection condition determination unit 5 selected and determined the "connection wait condition" is set in consideration of factors other than the recovery of the communication link to the cellular phone 50, which is different from the first embodiment. The configuration of the navigation apparatus 1 is explained hereinafter with a focus on the difference from the first embodiment. Explanation of the substantially same portion of the present embodiment is thus omitted for brevity.

1-3. Entire Configuration of the Handsfree System

Figure 4:
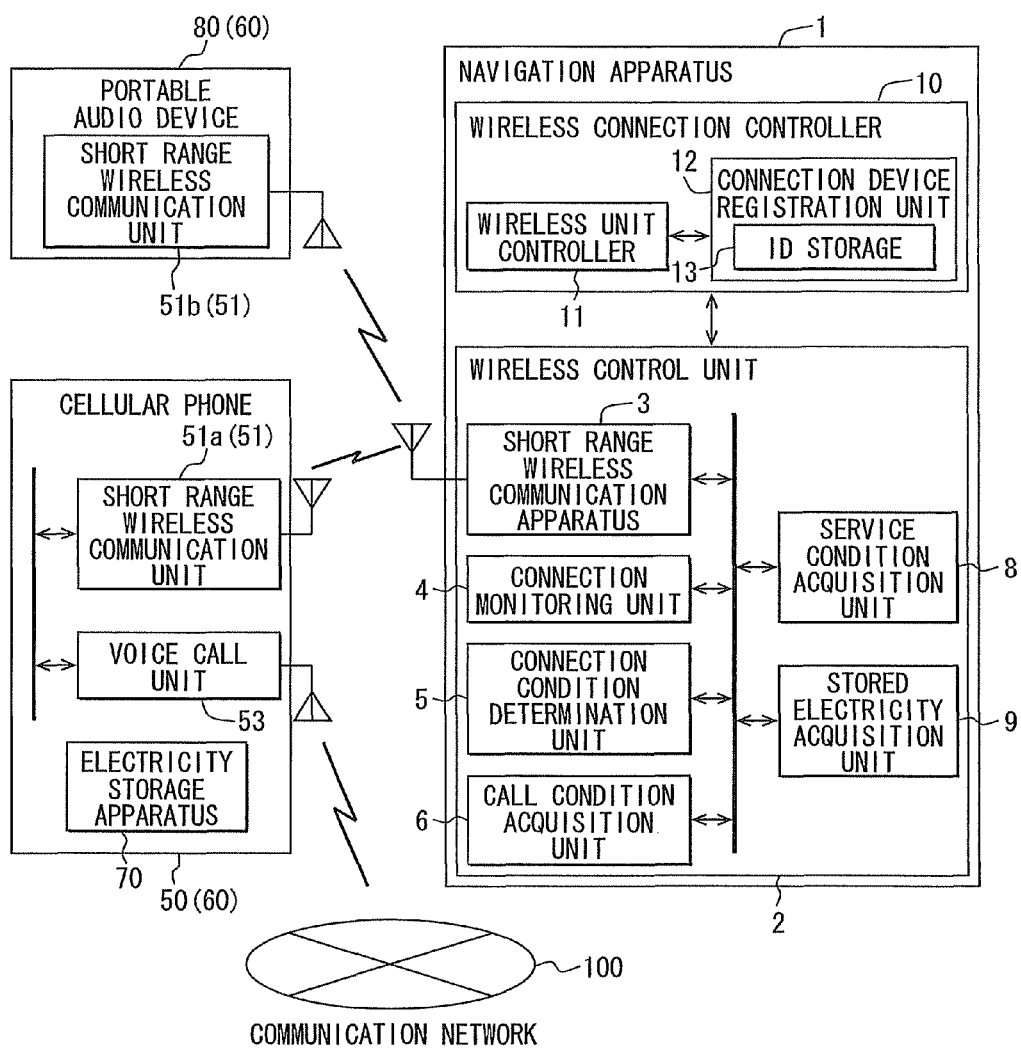
FIG. 4 is a block diagram of a handsfree system in a second embodiment of the present invention.

As shown in FIG. 4, the handsfree system in the present embodiment includes, in much the same way as the first embodiment, the navigation apparatus 1 and the cellular phone 50. The navigation apparatus 1 is capable of performing the short range wireless communication apparatus 3, and is capable of connecting wirelessly to a communication terminal 60 which is capable of executing the short range wireless communication of the same standard. FIG. 4 further shows, in addition to the cellular phone 50 which is serving as the communication terminal 60 that can perform the short range wireless communication as well as the voice call through the communication network 100, a portable audio device 80 that is capable of playing back a voice/music file, which serves as an example of the communication terminal 60 other than the cellular phone 50. The communication terminal 60 includes a short range wireless communication unit 51 for performing a short range wireless communication. In FIG. 4, the short range wireless communication unit 51 in the portable audio device 80 is shown with a suffix b, to be designated as a numeral "51b." The navigation apparatus 1 is configured to be capable of establishing the communication links with multiple communication terminals 60 at the same time (In the example of FIG. 4, the communication link is established to both of the cellular phone 50 and the portable audio device 80). In this case, though the communication terminal 60 other than the cellular phone 50 (In the example of FIG. 4, the portable audio device 80) is not an indispensable element in the present invention, the portable audio device 80 is used to facilitate a proper understanding of the present invention in FIG. 4.

The navigation apparatus 1 includes a wireless connection controller 10 for controlling the short range wireless communication performed by the wireless control unit 2. The wireless connection controller 10 is configured to be capable of exchanging information with the wireless control unit 2. Further, the wireless connection controller 10 includes multiple function units (In this example, a wireless unit controller 11 and a connection device registration unit 12). These function units are respectively implemented as hardware or software (i.e., a program) or a combination of the hardware and the software, by using a central processing unit in separate packages or in one common package for processing inputted data. Further, these function units are configured to exchange information therebetween through communication lines such as a digital transmission bus or the like. In this case, the function units implemented as software (i.e., a program) is stored in a memory unit such as RAM, ROM or the like which can be referred to by the processing unit.

The connection device registration unit 12 serves as a connection device registration unit, which performs a terminal registration process for registering the communication terminal 60 as an object terminal of wireless connection. More practically, the connection device registration unit 12 follows a predetermined registration processing procedure to register the communication terminal 60 in a communication range as a communication terminal that is capable of establishing the communication link to the navigation apparatus 1. Further, identification signs (e.g., IDs or the like) for identifying one or more communication terminals registered by the connection device registration unit 12 is stored in an ID storage 13 as information. In this case, the ID storage 13 is configured to include, as a hardware component, an information storage and rewritable medium such as a hard disk driver, a flash memory, and the like.

The wireless unit controller 11 serves as a communicable terminal identification unit for identifying the communication terminal 60 that allows establishment of the communication link to the short range wireless communication apparatus 3. More practically, information of the communication terminal 60 which is detected by the wireless control unit 2 in its communication range is transmitted to the wireless unit controller 11. Then, the wireless unit controller 11 determines whether or not the communication terminal 60 that allows the establishment of the communication link to the navigation apparatus 1 is found among the detected terminals 60 which are detected by the wireless control unit 2. The determination results are transmitted to the wireless control unit 2 as information. More practically, the wireless control unit 11 compares information of the identification signs transmitted from the wireless control unit 2 with information of the identification signs stored in the ID storage 13, to determine whether or not the communication terminal 60 to which establishment of the communication link with the navigation apparatus 1 is possible is found among the detected terminals 60 which are detected by the wireless control unit 2. Then, from among the communication terminals 60 to which establishment of the communication link with the navigation apparatus 1 is possible, whether or not there is any terminal 60 that allows establishment of the communication link to the navigation apparatus 1 is determined. In this case, the wireless unit controller 11 is basically configured to allow establishment of the communication link to all of the registered communication terminals 60 which are registered by the connection device registration unit 12 from among one or more communication terminals 60 in the communication range of the wireless control unit 2.

Then, the wireless control unit 2 performs a link establishing process for the communication terminal 60 to which the establishment of the communication link is allowed by the wireless unit controller 11, and the communication link between that communication terminal 60 and the navigation apparatus 1 (i.e., the short range wireless communication apparatus 3) is established. In this case, the link establishing process from the navigation apparatus 1 side described above is automatically performed when a main power source of the navigation apparatus 1 is turned on. Further, the link establishing process from the navigation apparatus 1 side may also be performed by the user operation on the navigation apparatus 1.

Further, the link establishing process is configured to be performable when the short range wireless communication apparatus 3 is in the "connection waiting condition" and a connection request is transmitted to the navigation apparatus 1 from the communication terminal 60 in the communication range of the wireless control unit 2. In such a case, the wireless control unit 2 transmits information of the communication terminal 60 which has transmitted the connection request to the wireless unit controller 11. The wireless unit controller 11 determines whether or not to allow the communication terminal 60, which has transmitted the connection request, to establish the communication link, and transmits the determination result to the wireless control unit 2. Then, the wireless control unit 2 performs the link establishing process for establishing the communication link to the communication terminal 60 when the wireless unit controller 11 has determined to allow communication with that communication terminal 60 which has transmitted the connection request.

In the present embodiment, the wireless unit controller 11 is configured to perform the link establishing process (i.e., a recovery process, of the communication link) to the communication terminal 60 (i.e., the cellular phone 50 that has performed the second disconnection) when the communication terminal 60 that has transmitted the connection request to the navigation apparatus 1 is the communication terminal 60 that has performed the second disconnection which has caused the current "connection wait condition." In other words, only a connection request from the cellular phone 50 that has performed the second disconnection is configured to be accepted in this example. Therefore, the recovery of the communication link to the cellular phone 50 that has performed the second disconnection is more securely performed. Further, an establishment of the communication link to the communication terminal 60 other than the cellular phone 50 which has performed the second disconnection (including a cellular phone other than the phone 50 which has performed the second disconnection, i.e., the portable audio device 80 in FIG. 4) regardless of the user intention or an establishment of the communication link by a non-standard procedure can be prevented.

Further, the wireless unit controller 11 serves as a wireless use condition setting unit for switching between a "use condition" which uses the wireless control unit 2 and a "non-use condition" which does not use the wireless control unit 2 according to the user operation or setting of the navigation apparatus 1. In this case, the power consumption of the navigation apparatus 1 is decreased by not providing power to the short range wireless communication apparatus 3 in the wireless control unit 2 in the "non-use condition" of the wireless control unit 2.

2-2. Configuration of the Wireless Control Unit

The wireless control unit 2 includes, in much the same way as the first embodiment, the connection condition determination unit 5 for determining the wireless connection condition of the short range wireless communication apparatus 3 when the disconnection of the once-established communication link is detected by the connection monitoring unit 4. Further, when the disconnection reason is the second disconnection and the "connection wait condition" is selected and determined due to the pre-disconnection cal condition being the "calling" condition, the connection condition determination unit 5 in the present embodiment is configured to end the "connection wait condition" in case (a) a connection identification process is performed, or (b) the short range wireless communication apparatus 3 is in a communication failure condition. In other words, the connection condition determination unit 5 is configured to perform at least one of two determinations, whether or not the connection identification process is performed and whether or not the short range wireless communication apparatus 3 is in the communication failure condition. In this example, the connection condition determination unit 5 performs both of the above two determinations, thereby determining the end of the "connection wait condition" when the connection identification process is performed or the short range wireless communication apparatus 3 is put in the "communication failure condition." Then, after the connection condition determination unit 5 determines the end of the "connection wait condition," information about the determination is input to the short range wireless communication apparatus 3, and the short range wireless communication apparatus 3 ends the "connection wait condition." In this case, the short range wireless communication apparatus 3 is configured to put in the "standby condition" after ending the "connection wait condition."

The "connection identification process" described above is a specific process that can be performed by the navigation apparatus 1 (e.g., a process related to the wireless connection), and is, more practically, a process for preparing or condition-changing of the wireless connection to the communication terminal 60 (including the cellular phone 50) that can perform the short range wireless communication. Further, the "communication failure condition" of the short range wireless communication apparatus 3 is a condition that is incapable of establishing the communication link by the short range wireless communication.

In the present embodiment, the end condition of the "connection wait condition" is set based on the "connection identification process" or the "communication failure condition," thus keeping the connection wait condition for an unnecessarily long time is prevented, and, as a result, preventing an unnecessary increase of the process load of the processor in the navigation apparatus 1. These advantages are explained in more details in the following.

In much the same way as the first embodiment, when the voice transfer operation is performed during the "calling" condition of the handsfree function in the present embodiment, the connection request is assumed to be transmitted from the cellular phone 50 to the navigation apparatus 1 after the end of the call. The short range wireless communication apparatus 3 is then put in the "connection wait condition" after the voice transfer operation, for the purpose of receiving the connection request from the cellular phone 50.

In such a case, depending on the communication environment after the end of the call, the connection request transmitted from the cellular phone 50 after the end of the call may not be received by the short range wireless communication apparatus 3, thereby leading to non-recovery of the communication link based on the connection request. If re-transmission of the connection request from the cellular phone 50 is configured not to be performed in such a situation, the "connection wait condition" may be kept unchanged even though the connection request is not transmitted from the cellular phone 50 and the process load of the processing unit in the navigation apparatus 1 may unnecessarily increase. The above situation, in which the "connection wait condition" is kept for unduly waiting for the connection request transmitted from the cellular phone 50, in spite of no prospect of transmitting the connection request from the cellular phone 50, may also occur when the cellular phone 50 is broken.

In view of the above problem, whether or not the process which suggests the end of the call of the cellular phone 50 (i.e., the "connection identification process" described above) has been performed in the navigation apparatus 1 is configured to be determined by the connection condition determination unit 5 in the present embodiment. In other words, when the user operation triggered the process for preparing or condition-changing of the wireless connection to the communication terminal 60 (including the cellular phone 50) that can perform the short range wireless communication, it is generally assumed that the call by the user using the cellular phone 50 has ended. Therefore, the connection condition determination unit 5 determines to end the "connection wait condition" when the connection identification process is performed.

Further, when the short range wireless communication apparatus 3 is in the "communication failure condition," the communication link cannot be recovered by transmitting the connection request from the cellular phone 50. Therefore, in the present embodiment, the connection condition determination unit 5 determines whether or not the short range wireless communication apparatus 3 is in the communication failure condition, and the "connection wait condition" is determined to be ended when the short range wireless communication apparatus 3 is in the communication failure condition.

By the above-described configuration that sets the end condition for ending the "connection wait condition," keeping the "connection wait condition" for an unnecessarily long time is prevented and, an unnecessary increase of the process load of the processing unit in the navigation apparatus 1 is prevented.

The "connection identification process" in the present embodiment includes the "terminal registration process" for registering the communication terminal 60 as an object terminal of wireless connection, and includes the "link establishing process" for establishing the communication link by the short range wireless communication to the communication terminal 60 (including the cellular phone 50 that has performed the second disconnection). In this case, the "terminal registration process" is an example of a process for the preparation for the wireless connection, and the "link establishing process" is an example of a process for the condition change of the wireless connection. Further, the "connection identification process" may include other processes (e.g., a "link disconnection process" for disconnecting the communication link by the short range wireless connection or the like). In other words, the "condition change of the wireless connection" in the present invention is a concept that includes both of the connection process and the disconnection process of the communication link.

Further, the "communication failure condition" includes a "non-operation condition" in which the short range wireless communication apparatus 3 is not in operation. In this case, the "non-operation condition" is, or example, a "non-use condition," in which power supply for the wireless control unit 2 is stopped, or the operation of the wireless control unit 2 is invalidated, according to the user operation or the setting of the navigation apparatus 1. Further, the power-off condition of the main power of the navigation apparatus 1 (e.g., an accessory switch for switching on and off of power supply to each of the electric device in the vehicle is in a turned-off condition) may also be included in the "non-operation condition."

The present embodiment exemplifies that the connection condition determination unit 5 is configured to consider only the "terminal registration process" and the "link establishing process" as an object of determination by the "connection identification process," and is configured to consider only the "non-operation condition" to be the "communication failure condition" as an object of determination. In other words, the connection condition determination unit 5 in the present embodiment is configured to end the "connection wait condition" when the "terminal registration process" is performed, or when the "link establishing process" is performed, or when the short range wireless communication apparatus 3 is put in the "non-operation condition." For enabling the above-described determination, the connection condition determination unit 5 has an input of information regarding that the "terminal registration process" is performed in the navigation apparatus 1 from, for example, the connection device registration unit 12, when such process is performed. Further, the connection condition determination unit 5 has an input of information regarding that the "link establishing process" is performed in the navigation apparatus 1 from, for example, the short range wireless communication apparatus 3. Furthermore, the connection condition determination unit 5 has an input of information regarding that the short range wireless communication apparatus 3 is put in the "non-operation condition" from the wireless unit controller 11, for example, when such condition is realized.

In this case, the above-described "link establishing process" includes a process for establishing the communication link to the cellular phone 50 that has performed the second disconnection. In such a case, the link establishing process serves as a communication link recovery process. Therefore, in the present embodiment, the "connection wait condition" also ends after the recovery of the communication link to the cellular phone 50 is complete.

2-3. Procedure of Connection Process

Procedure of an end determination process (an end determination method) for ending the "connection wait condition" performed by the connection condition determination unit 5 in the present embodiment is explained with reference to FIG. 5 in the following. The procedure of the end determination process may be performed by hardware, software (i.e., a program), or a combination of the hardware and software, which implements the connection condition determination unit 5. When the connection condition determination unit 5 is implemented as a program, the processing unit in the navigation apparatus 1 serves as a computer for executing the program to implement the connection condition determination unit 5.

When the short range wireless communication apparatus 3 is determined as the "connection wait condition" (step #11: Yes), the connection condition determination unit 5 determines whether or not the "terminal registration process" is performed (step #12). If the "terminal registration process" is performed (step #12:Yes), the connection condition determination unit 5 determines to end the "connection wait condition" (step #15). On the other hand, if the "terminal registration process" is not performed (step #12:No), the connection condition determination unit 5 determines whether or not the "link establishing process" is performed (step #13). If the "link establishing process" is performed (step #13:Yes), the connection condition determination unit 5 determines to end the "connection wait condition" (step #15). On the other hand, if the "link establishing process" is not performed (step #13:No), the connection condition determination unit 5 determines whether or not the short range wireless communication apparatus 3 is put in the "non-operation condition" (step #14). If the short range wireless communication apparatus 3 is put in the "non-operation condition" (step #14:Yes), the connection condition determination unit 5 determines to end the "connection wait condition" (step #15). On the other hand, if the short range wireless communication apparatus 3 is not put in the "non-operation condition" (step #14:No), the process returns to step #12. That is, while none of the "terminal registration process" and the "link establishing process" is performed and the short range wireless communication apparatus 3 is not put in the "non-operation condition," the process between step #12 and step #14 is repeated. When at least one of step #12 to step #14 is determined as "Yes," that is, when at least one of the "terminal registration process" and the "link establishing process" is performed, or when the short range wireless communication apparatus 3 is put in the "non-operation condition," the connection condition determination unit 5 determines to end the "connection wait condition." In such a case, an order of performing step #12 to step #14 may be changed, and at least two of those three steps may be performed at the same time.

3. Other Embodiments

The other embodiments of the vehicle terminal apparatus in the present invention is explained in the following. Each of the features and advantages in those embodiments is not only applicable to one of those embodiments, but also be applicable to other embodiments in combination with other features and advantages, as long as not causing conflicts with each other.

(1) In the first and second embodiments described above, the description exemplifies that the connection condition determination unit 5 determines the wireless connection condition of the short range wireless communication apparatus 3 based on the communication link disconnection reason, the pre-disconnection call condition, and the pre-disconnection service condition. However, without such limitation, the connection condition determination unit 5 may be configured to determine the wireless connection condition of the short range wireless communication apparatus 3 based only on the communication link disconnection reason and the pre-disconnection call condition, without regard to the pre-disconnection service condition. In such a case, the navigation apparatus 1 may be configured not to have the service condition acquisition unit 8. Further, the connection condition determination unit 5 may additionally consider the wireless connection intensity (i.e., radio wave condition) of the short range wireless communication between the short range wireless communication apparatus 3 and the cellular phone 50, for determining the wireless condition of the short range wireless communication apparatus 3 after the disconnection of the communication link, for more preferable implementation of the present invention.

(2) In the first and second embodiments described above, the description exemplifies that the pre-disconnection service condition is classified into two types of the "out-of-area" condition and the "in-area" condition. However, without such limitation, the pre-disconnection condition may be classified into three or more types according to the wireless connection intensity (i.e., radio wave condition), such as the "out-of-area" condition, the "first in-area" condition, the "second in-area" condition, the "third in-area" condition, and the "fourth in-area" condition, for more preferable implementation of the present invention.

(3) In the first and second embodiments described above, the description exemplifies that the call condition of the cellular phone 50 is classified into five types of the "waiting" condition, the "receiving" condition, the "dialing" condition, the "ringing" condition, and the "calling" condition. However, without such limitation, the call condition of the cellular phone 50 may be classified into three conditions of the "first (dialing)" condition, the "second (calling)" condition, and the "third" condition (=none of the first and second conditions), or may be classified into two conditions of the "first (waiting)" condition and the "second" condition (=other than the first condition), or may be classified into the number of types other than five, for more preferable implementation of the present invention.

(4) In the first and second embodiments described above, the description exemplifies that the connection condition determination unit 5 determines the wireless connection condition of the short range wireless communication apparatus 3, based on the communication link disconnection reason, the pre-disconnection call condition, and the pre-disconnection service condition. However, without such limitation, the connection condition determination unit 5 may additionally consider the pre-disconnection stored electricity amount in the electricity storage apparatus 70, which is the amount of the stored amount of electricity in the apparatus 70 immediately before the disconnection of the communication link, in addition to the communication link disconnection reason, the pre-disconnection call condition, and the pre-disconnection service condition for more preferable implementation of the present invention. In such a case, the connection condition determination unit 5 can acquire the pre-disconnection stored electricity amount from the stored electricity acquisition unit 9 when the communication link is disconnected. Further, in that case, the connection condition determination unit 5 may also preferably determine the wireless connection condition of the short range wireless communication apparatus 3 based on the communication link disconnection reason, the pre-disconnection call condition, and the pre-disconnection stored electricity amount, without regard to the pre-disconnection service condition. Furthermore, when the connection condition determination unit 5 determines the wireless connection condition of the short range wireless communication apparatus 3 without regard to the pre-disconnection stored electricity amount, the navigation apparatus 1 may be preferably configured not to have the stored electricity acquisition unit 9.

Further, as described above, when the connection condition determination unit 5 determines the wireless connection condition of the short range wireless communication apparatus 3 based additionally on the pre-disconnection stored electricity amount, the connection condition determination unit 5 may preferably select and determine the "standby condition" as the wireless connection condition of the short range wireless communication apparatus 3 if the pre-disconnection stored electricity amount is equal to or less than the predetermined threshold. The predetermined threshold may be a value for each of "continuously-callable" times of the handsfree call, such as one minute, five minutes, or the like, for example. Further, the predetermined threshold may be determined based on the full-charge capacity of the electricity storage apparatus 70, such as a value of 5%, or 10% of the full-charge stored electricity amount, for example.

(5) In the first and second embodiments described above, the description exemplifies that the connection condition determination unit 5 determines the wireless connection condition of the short range wireless communication apparatus 3 after the disconnection of once-established communication link based on the rules shown in FIG. 2. However, without such limitations, the wireless connection condition of the short range wireless communication apparatus 3, especially when the disconnection reason is the "second disconnection," may arbitrarily be changed from the above embodiment, according to the specification or the like of the cellular phone 50. That is, when the cellular phone 50 is configured to be put in a condition of transmitting the connection request to the short range wireless communication apparatus 3 after the disconnection of the communication link, the wireless connection condition of the short range wireless communication apparatus 3 may preferably be put in the "connection wait condition." When the cellular phone 50 is configured to disconnect the communication link without regard to the user operation, the wireless connection condition of the short range wireless communication apparatus 3 may preferably be put in the "connection request condition."

(6) In the first and second embodiments described above, the description exemplifies that the connection condition determination unit 5 selects and determines, as the wireless connection condition of the short range wireless communication apparatus 3, one of the "connection wait condition," the "connection request condition," and the "standby condition." However, without such limitations, selectable conditions may only be two of the above-described three conditions of the "connection wait condition," the "connection request condition," and the "standby condition" in the first embodiment. Further, in the second embodiment, the selectable conditions may preferably be the "connection wait condition" plus only one of the "connection request condition" and the "standby" condition. Furthermore, another condition such as an "other terminal connection request condition" for transmitting the connection request to a cellular phone 50, which is different from the cellular phone 50 that has the once-established communication link may be included as the selectable conditions other than the "connection wait condition," the "connection request condition," and the "standby condition."

(7) In the first embodiment described above, the description exemplifies that the connection condition determination unit 5 is configured to end the "connection request condition" or the "connection wait condition," which is selected and determined by the connection condition determination unit 5, when the communication link to the cellular phone 50 is recovered. Further, in the second embodiment described above, the description exemplifies that the "connection wait condition" ends after the connection condition determination unit 5 selects the "connection wait condition," if the connection identification process is performed or if the short range wireless communication apparatus 3 is put in the communication failure condition. However, without such limitations, the "connection request condition" or the "connection wait condition" may be configured to end after a predetermined wait time, such as five minutes, ten minutes, thirty minutes, or one hour.

(8) In the second embodiment described above, the description exemplifies that only the connection request from the cellular phone 50 that has performed the second disconnection is accepted. However, without such limitations, the connection request from the communication terminal 60 other than the cellular phone 50 having performed the second disconnection may rightfully be accepted in the "connection wait condition" for establishing the communication link to the communication terminal 60. In such a case, the connection request may configured to be accepted only from the registered cellular phone 50, only from the registered communication terminal 60 (including the cellular phone 50), or from non-registered communication terminal 60 (including the cellular phone 50). Further, when the connection request from the non-registered communication terminal 60 (including the cellular phone 50) is configured to be accepted, establishing the communication link to the non-registered communication terminal 60 and registration of that communication terminal 60 are performed at the same time. Furthermore, in the configuration of accepting the connection request from the non-registered communication terminal 60 that is different from the cellular phone 50 that has performed the second disconnection and establishing the communication link to that communication terminal 60, the "connection wait condition" may be kept for waiting for the reception of the connection request from that cellular phone 50 that is different from the cellular phone 50 having performed the second disconnection after the establishment of the communication link to the communication terminal 60, or the "connection wait condition" may end after the establishment of such communication link to the communication terminal 60.

(9) In the second embodiment described above, the description exemplifies that the connection condition determination unit 5 determines both of whether or not the connection identification process is performed and determines whether or not the short range wireless communication apparatus 3 is in the communication failure condition. However, without such limitations, the connection condition determination unit 5 may be configured to determine only one of the above two determinations, only one of whether or not the connection identification process is performed or whether or not the short range wireless communication apparatus 3 is in the communication failure condition, and whether or not to end the "connection wait condition" is determined based on the determination result of the above determination

(10) In the second embodiment described above, the description exemplifies that the connection condition determination unit 5 is configured to end the "connection wait condition" when the "terminal registration process" is performed, or when the "link establishing process" is performed, or when the short range wireless communication apparatus 3 is put in the "non-operation condition." However, without such limitations, the determination of whether or not to end the "connection wait condition" may be configured to be performed based on only two of the above three conditions, or based on only one of the above three conditions. Further, the connection condition determination unit 5 may be configured to additionally consider a condition that a "link disconnection process" is performed.

(11) In the first and second embodiments described above, the description exemplifies that the short range wireless communication apparatus 3 is configured to be uniformly put in the "connection wait condition" when the voice transfer operation is performed, without distinction between a case that the user performs the voice transfer operation on the navigation apparatus 1 and a case that the user performs the voice transfer operation on the cellular phone 50. However, without such limitations, these two operations may be distinguished, and only one of the two operations (e.g., only when the user performs the voice transfer operation on the navigation apparatus 1) may preferably be configured to lead to the "connection wait condition" of the short range wireless communication apparatus 3. In such a configuration, the connection condition determination unit 5 is configured to determine the wireless connection condition of the short range wireless communication apparatus 3, based on whether or not the user has performed the voice transfer operation on the navigation apparatus 1, in addition to the communication link disconnection reason and the pre-disconnection call condition.

(12) In the first and second embodiments described above, the description exemplifies that the vehicle terminal apparatus is the navigation apparatus 1 and the portable terminal is the cellular phone 50. However, without such limitations, the vehicle terminal apparatus may be a vehicle apparatus other than the navigation apparatus 1, or the portable terminal may be a terminal other than the cellular phone 50 that can perform both of the voice call and data communication, for another preferable implementation of the present invention.

(13) The first and second embodiments described above show only two of many examples of the wireless control unit 2. Therefore, in the navigation apparatus 1, what to be included as the components of the wireless control unit 2 may arbitrarily be changed.

(14) In the first and second embodiments for showing examples of the present invention, other configurations of the above description may also be arbitrarily changed without limitations. In other words, the present invention may include various configurations, in which non-claimed elements may be changed, as long as claimed elements and equivalents thereof are included therein.

The present invention may be preferably applicable to the vehicle terminal apparatus which is equipped with the wireless communication apparatus that is capable of performing the short range wireless communication and which wirelessly connects, by using the wireless communication apparatus, to the portable terminal that is capable of (a) performing the voice call through the communication network and (b) performing the short range wireless communication.

The invention claimed is:

1. A vehicle terminal apparatus comprising:
a wireless communication device for performing a short range wireless communication, wherein the vehicle terminal apparatus connects the wireless communication device to a portable terminal that enables a voice call and the short range wireless communication through a communication network;
a connection monitoring unit for monitoring a disconnection of a communication link between the wireless communication device and the portable terminal, wherein the connection monitoring unit considers an abnormal disconnection of the communication link as a link loss, the connection monitoring unit considers a disconnection of the communication link by a disconnection process by the wireless communication device as a first disconnection, and the connection monitoring unit considers a disconnection of the communication link by a disconnection process by the portable terminal as a second disconnection; and
a connection condition determination unit for determining a wireless connection condition of the wireless communication device based on a disconnection reason that accounts for a reason for disconnection and a pre-disconnection call condition that is a call condition of the portable terminal immediately before the disconnection when the disconnection of the communication link is detected by the connection monitoring unit.

2. The vehicle terminal apparatus of claim 1, wherein
the connection condition determination unit selects and determines, as a wireless connection condition of the wireless communication device, one of (a) a connection request condition for transmitting a connection request to the portable terminal, (b) a connection wait condition for waiting for reception of a connection request transmitted from the portable terminal, or (c) a standby condition for performing none of the transmitting the connection request to the portable terminal and the waiting for reception of the connection request from the portable terminal.

3. The vehicle terminal apparatus of claim 2, wherein
the connection condition determination unit selects and determines the connection wait condition as the wireless connection condition of the wireless communication device when the disconnection reason is the second disconnection and the pre-disconnection call condition is a busy condition.

4. The vehicle terminal apparatus of claim 3, wherein
the connection condition determination unit ends the connection wait condition when a connection identification process for preparation of wireless connection or for changing the wireless connection condition to the communication terminal that is capable of performing the short range wireless communication is performed or when the wireless communication device is put in a communication failure condition that is incapable of establishing the communication link by the short range wireless communication.

5. The vehicle terminal apparatus of claim 4, wherein
the connection identification process includes (a) a terminal registration process for registering the communication terminal as an object terminal of wireless connection, and (b) a link establishing process for establishing the communication link by the short range wireless communication to the communication terminal, and the communication failure condition includes a non-operation condition in which the wireless communication device is not in operation.

6. The vehicle terminal apparatus of claim 3, wherein
the connection wait condition accepts the connection request only from the portable terminal that has performed the second disconnection.

7. The vehicle terminal apparatus of claim 2, wherein
the connection condition determination unit selects and determines the connection request condition if the disconnection reason is the link loss, and the connection condition determination unit selects and determines the standby condition if the disconnection reason is the first disconnection or if the disconnection reason is the second disconnection with the pre-disconnection call condition being none of the dialing condition and the busy condition.

8. The vehicle terminal apparatus of claim 1, wherein
the communication link to the portable terminal is further evaluated by a pre-disconnection service condition which is determined as one of (a) an in-area condition that the portable terminal is in a voice call serviceable area and (b) an out-of-area condition that the portable terminal is out of the voice call serviceable area, and the connection condition determination unit determines the wireless connection condition of the wireless communication device based further on the pre-disconnection service condition.

9. The vehicle terminal apparatus of claim 8, wherein,
when the disconnection reason is the second disconnection and the pre-disconnection call condition is the dialing condition, the connection condition determination unit selects and determines either of (a) the standby condition for performing none of the transmitting the connection request to the portable terminal and the waiting for reception of the connection request from the portable terminal if the pre-disconnection service condition is the in-area condition or (b) the connection request condition for transmitting a connection request to the portable terminal if the pre-disconnection service condition is the out-of-area condition.

10. The vehicle terminal apparatus of claim 1, wherein
the portable terminal has an electricity storage unit for operating the portable terminal, and
the connection condition determination unit determines the wireless connection condition of the wireless communication device based further on a pre-disconnection electricity amount that indicates an amount of the electricity stored in the electricity storage unit immediately before the disconnection of the communication link.

11. The vehicle terminal apparatus of claim 10, wherein
the connection condition determination unit selects and determines the standby condition that performs none of transmission of the connection request to the portable terminal and the waiting for reception of the connection request from the portable terminal, when the pre-disconnection electricity amount is equal to or lower than a threshold.

12. A program product on a non-transitory computer readable memory for performing wireless connection by controlling a computer to serve as a vehicle terminal apparatus, the program product comprising:
providing a wireless communication device for performing a short range wireless communication, wherein the vehicle terminal apparatus connects the wireless communication device to a portable terminal that enables a voice call and the short range wireless communication through a communication network;

providing a connection monitoring unit for monitoring a communication link between the wireless communication device and the portable terminal, wherein the connection monitoring unit considers an abnormal disconnection of the communication link as a link loss, the connection monitoring unit considers a disconnection of the communication link by a disconnection process by the wireless communication device as a first disconnection, and the connection monitoring unit considers a disconnection of the communication link by a disconnection process by the portable terminal as a second disconnection; and providing a connection condition determination unit for determining a wireless connection condition of the wireless communication device based on a disconnection reason that accounts for a reason for disconnection and a pre-disconnection call condition that is a call condition of the portable terminal immediately before the disconnection when the disconnection of the communication link is detected by the connection monitoring unit.

\* \* \* \* \*